United States Patent
Ikram UL Haq et al.

(10) Patent No.: US 11,121,656 B2
(45) Date of Patent: Sep. 14, 2021

(54) METHOD OF CONTROLLING AN ELECTRICAL MACHINE

(71) Applicant: ABB Schweiz AG, Baden (CH)

(72) Inventors: Omer Ikram UL Haq, Surahammar (SE); Luca Peretti, Järfälla (SE)

(73) Assignee: ABB Schweiz AG, Baden (CH)

( * ) Notice: Subject to any disclaimer, the term of this patent is extended or adjusted under 35 U.S.C. 154(b) by 149 days.

(21) Appl. No.: 16/667,560

(22) Filed: Oct. 29, 2019

(65) Prior Publication Data

US 2020/0144947 A1 May 7, 2020

(30) Foreign Application Priority Data

Nov. 7, 2018 (EP) ..................... 18204969

(51) Int. Cl.
*H02P 27/08* (2006.01)
*H02P 21/13* (2006.01)
(Continued)

(52) U.S. Cl.
CPC .............. *H02P 21/13* (2013.01); *H02P 21/18* (2016.02); *H02P 21/22* (2016.02)

(58) Field of Classification Search
CPC .......... H02P 21/13; H02P 21/16; H02P 21/18; H02P 21/22; H02P 6/183; H02P 6/185
See application file for complete search history.

(56) References Cited

U.S. PATENT DOCUMENTS

| | | | |
|---|---|---|---|
| 9,948,224 B1 | 4/2018 | Huh et al. | |
| 2013/0021011 A1* | 1/2013 | Okuda | H02M 3/158 323/282 |
| 2018/0145621 A1* | 5/2018 | Aliprantis | H02P 21/22 |

FOREIGN PATENT DOCUMENTS

| | | |
|---|---|---|
| DE | 102015117912 A1 | 4/2019 |
| EP | 1334552 A2 | 8/2003 |

OTHER PUBLICATIONS

European Search Report Application No. 18204969.2 Completed: Apr. 12, 2019; dated May 3, 2019 9 Pages.
(Continued)

*Primary Examiner* — Muhammad S Islam
(74) *Attorney, Agent, or Firm* — Whitmyer IP Group LLC

(57) ABSTRACT

A method of controlling an electrical machine, wherein the method includes: a) injecting a first voltage waveform ($u^{h_x}$) with a first fundamental frequency into the electrical machine in a first axis of a rotor reference frame, combined with a voltage signal for controlling the electrical machine, b) determining a second axis current component ($i_q^{h_x}$) of a second axis of the rotor reference frame, having the first fundamental frequency, generated in response to the injection of the first voltage waveform ($u^{h_x}$), c) controlling based on the second axis current component ($i_q^{h_x}$) a second axis voltage component ($u_q^{h_x}$) of the second axis, having the first fundamental frequency, to obtain an adjusted second axis voltage component for controlling the second axis current component ($i_q^{h_x}$) towards zero, d) feeding back the adjusted second axis voltage component to combine the adjusted second axis voltage component with the voltage signal and the injected first voltage waveform ($u^{h_x}$), and repeating steps b)-d) until the second axis current component is smaller than a threshold value ($i_q^{h_x}$), e) determining a differential cross-coupling parameter of the electrical machine based on the second axis voltage component ($u_q^{h_x}$) and a first axis current component ($i_d^{h_x}$) having the first fundamental frequency, when the second axis current component is smaller than the threshold value ($i_q^{h_x}$), and g) controlling the electrical machine based on the differential cross-coupling parameter.

17 Claims, 1 Drawing Sheet

(51) Int. Cl.
   *H02P 21/18*   (2016.01)
   *H02P 21/22*   (2016.01)

(56) References Cited

OTHER PUBLICATIONS

Seilmeier, Markus et al: "HF Test Current Injection-Based Self-Sensing Control of PMSM for Low-and Zero-Speed Range Using Two-Degree-of-Freedom Current Control", IEEE Transactions of Industry Applications, IEEE Service Center, Piscataway, NJ, US, vol. 51, No. 3, published May 1, 2015, pp. 2268-2278, XP011581597, ISSN:0093-9994, DOI:10.1109/TIA.2014.2369828 11 Pages.

Ebersberger, Sebastian et al: "Identification of Differential Inductances of Permanent Magnet Synchronous Machines Using Test Current Signal Injection", Power Electronics, Electrical Drives, Automation and Motion (Speedam), 2012 International Symposium on, IEEE, published Jun. 20, 2012, pp. 1342-1347, XP032221714, DOI: 10.1109/SPEEDAM.2012.6264392, ISBN: 978-1-4673-1299-8 6 Pages.

Cizmic, Mirza et al: "Improved Identification of High Frequency Parameters for Self-Sensing Control of PMSM Using Test Current Signal Injection", 2018 IEEE 9th International Symposium of Sensorless Control for Electrical Drives (SLED), IEEE, published Sep. 13, 2018, pp. 18-23, XP033417511, DOI: 10.1109/SLED.2018.8486134 6 Pages.

\* cited by examiner

METHOD OF CONTROLLING AN ELECTRICAL MACHINE

TECHNICAL FIELD

The present disclosure generally relates to electrical machines and in particular to a method of controlling an electrical machine.

BACKGROUND

Injection methods for estimating the electric position of an electrical machine may be used instead of employing sensors for detecting the electrical position. One example of such a method is disclosed in EP1334552B1. According to the method disclosed in EP1334552B1 a first signal is injected into the d-axis, and an observer controller for measuring current feedback response to the injected first signal to determine an estimated position of the motor.

One drawback with the method disclosed in EP1334552B1 is that it will result in poor precision when determining the estimated position in certain types of electrical machines because the method does not take the presence of the cross-coupling inductance/flux into account.

SUMMARY

In view of the above, an object of the present disclosure is to provide a method of controlling an electrical machine which solves, or at least mitigates, the problems of the prior art.

There is hence according to a first aspect of the present disclosure provided a method of controlling an electrical machine, wherein the method comprises: a) injecting a first voltage waveform having a first fundamental frequency into the electrical machine in a first axis of a rotor reference frame, combined with a voltage signal for controlling the electrical machine, b) determining a second axis current component of a second axis of the rotor reference frame, having the first fundamental frequency, generated in response to the injection of the first voltage waveform, c) controlling based on the second axis current component a second axis voltage component of the second axis, having the first fundamental frequency, to obtain an adjusted second axis voltage component for controlling the second axis current component towards zero, d) feeding back the adjusted second axis voltage component to combine the adjusted second axis voltage component with the voltage signal and the injected first voltage waveform, and repeating steps b)-d) until the second axis current component is smaller than a threshold value, e) determining a differential cross-coupling parameter of the electrical machine based on the second axis voltage component and a first axis current component having the first fundamental frequency, when the second axis current component is smaller than the threshold value, and g) controlling the electrical machine based on the differential cross-coupling parameter.

The effect of the differential cross-coupling parameter on the electrical position of the electrical machine may hence be compensated. The electrical position of the electrical machine may thereby be determined more precisely. As a result, more precise electrical machine control may be obtained.

One embodiment comprises f) determining an electric angle error based on the differential cross-coupling parameter, wherein the electric angle error is used for error compensation in step g) of controlling.

One embodiment comprises h) injecting a second voltage waveform with a second fundamental frequency into the electrical machine in the first axis of the rotor reference frame, combined with the voltage signal for controlling the electrical machine, and i) determining an observed electric angle based on the second voltage waveform, wherein the method comprises j) determining an actual electric angle based on the observed electric angle and the electric angle error, and wherein the controlling in step g) is based on the actual electric angle.

According to one embodiment step i) comprises i1) determining a second axis current component of the second axis of the rotor reference frame, having the second fundamental frequency, generated in response to the injection of the second voltage waveform, i2) demodulating the second axis current component, i3) low-pass filtering the demodulated second axis current component, and i4) controlling the low-pass filtered second axis current component to zero to thereby obtain an actual mechanical speed times the number of pole pairs, and i5) determining the observed electric angle by integration of the actual mechanical speed times the number of pole pairs.

One embodiment comprises performing steps a)-e) only when the electrical machine is operated at a speed which is at least 10% of a nominal speed of the electrical machine and not higher than a nominal speed.

One embodiment comprises interpolating the differential cross-coupling parameter or an electric angle error determined based on the differential cross-coupling parameter for a specific torque at a speed which is at least 10% above the nominal speed of the electrical machine and not higher than a nominal speed to the same torque for a speed which is lower than 10% of the nominal speed of the electrical machine, and storing the interpolated differential cross-coupling parameter or electric angle error in a look-up table.

One embodiment comprises performing steps h)-j) and g) only when the electrical machine is operated at a speed which is lower than 10% of the nominal speed of the electrical machine.

According to an embodiment in which steps h)-j) and g) are performed only when the electrical machine is operated at a speed which is lower than 10% of the nominal speed of the electrical machine, and steps h)-j) and g) are performed only when the electrical machine is operated at a speed which is lower than 10% of the nominal speed of the electrical machine, the first fundamental frequency and the second fundamental frequency may be the same frequency. Alternatively, the first fundamental frequency and the second fundamental frequency may differ.

According to one embodiment steps a) and h) are performed simultaneously, wherein the first fundamental frequency is a non-integer multiple of the second fundamental frequency.

According to one embodiment the first fundamental frequency is a first prime number and the second fundamental frequency is a second prime number.

According to one embodiment the differential cross-coupling parameter is a differential cross-coupling inductance or a differential cross-coupling flux.

The differential cross-coupling inductance is defined by $$L_{dq} = \frac{\Delta \psi_d}{\Delta i_q}$$

or $$L_{qd} = \frac{\Delta \psi_q}{\Delta i_d},$$

where $\Delta\psi_d$ or more precisely $\Delta\psi_d(\Delta i_d, i_q)$ is the d-axis differential flux in the rotor reference frame, i.e. the difference between two fluxes, and $\Delta i_q$ is the difference between the two q-axis currents which correspond to the two fluxes used in the differential flux $\Delta\psi_d$. Due to the cross-coupling, a change in the q-axis current results in a change in the d-axis flux. $\Delta\psi_q$ or more precisely $\Delta\psi_q(i_d, \Delta i_q)$ is the q-axis differential flux, and $\Delta i_d$ is the difference between corresponding two d-axis differential currents. Generally, $L_{dq}=L_{qd}$.

The differential cross-coupling flux $\Delta\psi_d$, cc is a function of the d-axis current $i_d$ and a difference $\Delta i_q$ between q-axis currents, i.e. $\Delta\Psi_{d,cc}=\Delta\Psi_d(i_d, \Delta i_q)$. The differential cross-coupling flux $\Delta\Psi_q$, cc is a function of a difference $\Delta i_d$ between d-axis currents, i.e. $\Delta\psi_{q,cc}=\Delta\psi_q(\Delta i_d, i_q)$ and the q-axis current $i_q$.

According to one embodiment the differential cross-coupling parameter is a differential cross-coupling inductance, and wherein step e) involves integrating the second axis voltage component and multiplying the integrated second axis voltage component with the inverse of the first axis current component having the frequency of the first fundamental frequency to obtain the differential cross-coupling parameter.

According to one embodiment step a) of determining the second axis current component involves filtering a non-filtered second axis current component with a filter that has a center frequency at the first fundamental frequency, to obtain the second axis current component.

The filter may for example be a band stop filter or a band pass filter. In case the filter is a band stop filter, the non-filtered second axis current component is added to the band stop filtered second axis current component to obtain the second axis current component having the first fundamental frequency.

According to one embodiment step i1) of determining the second axis current component involves filtering a non-filtered second axis current component with a filter that has a center frequency at the second fundamental frequency, to obtain the second axis current component.

The filter may for example be a band stop filter or a band pass filter. In case the filter is a band stop filter, the non-filtered second axis current component is added to the band stop filtered second axis current component to obtain the second axis current component having the first fundamental frequency.

There is according to a second aspect of the present disclosure provided a computer program comprising computer executable components which when executed by processing circuitry of a control system causes the control system to perform the steps of the method of the first aspect.

There is according to a third aspect of the present disclosure provided a control system for controlling an electrical machine, wherein the control system comprises: processing circuitry, and a storage medium comprising a computer program which when executed by the processing circuitry causes the control system to perform the steps of the method according to the first aspect.

There is according to a fourth aspect of the present disclosure provided an electrical power system comprising: an electrical machine, a power converter configured to control the electrical machine, and a control system according to the fourth aspect, configured to control the power converter.

Generally, all terms used in the claims are to be interpreted according to their ordinary meaning in the technical field, unless explicitly defined otherwise herein. All references to "a/an/the element, apparatus, component, means, etc.", are to be interpreted openly as referring to at least one instance of the "element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
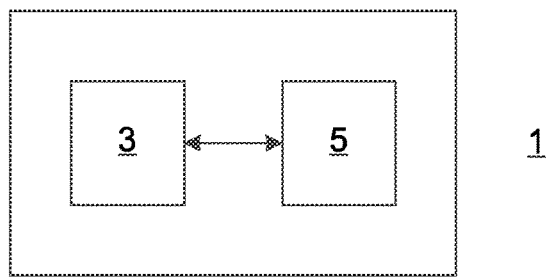
FIG. 1 schematically shows an example of a control system for controlling an electrical machine.

FIG. 1 shows an example of a control system 1 for controlling an electrical machine, such as a motor or a generator having a stator and a rotor, by means of a power converter. The electrical machine may for example be a synchronous machine, such as a surface mounted permanent magnet machine, an interior permanent magnet synchronous machine, a permanent magnet assisted synchronous machine, or a synchronous reluctance machine.

The control system 1 comprises a storage medium 3 and processing circuitry 5. The storage medium comprises computer code which when executed by the processing circuitry 5 causes the control system 1 to perform the steps of the methods described herein.

The storage medium 3 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

The processing circuitry 5 may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning control of a power converter and an electrical machine.

Figure 2:
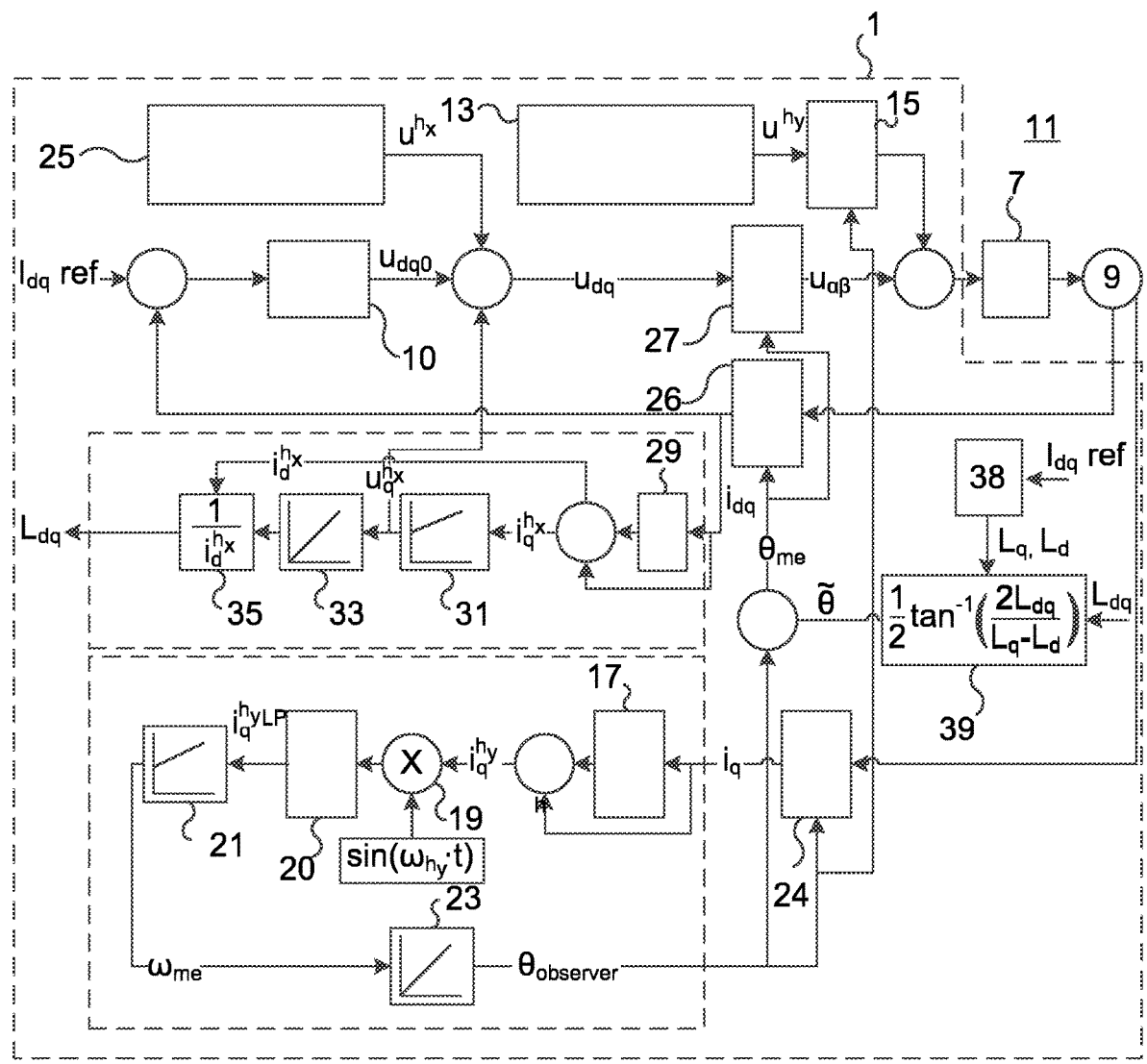
FIG. 2 schematically shows a block diagram of the control system in an electrical power system.

FIG. 2 shows an example of a particular realization of the control system 1, in terms of functional blocks. The functional blocks may be implemented in software and/or hardware. The control system 1 is configured to control a power converter 7 configured to control an electrical machine 9. The control system 1, the power converter 7 and the electrical machine 9 form an electrical power system 11.

In the following, a part of the exemplified method which involves the injection of what is herein referred to as the second voltage waveform will first be described, in order to illustrate the error obtained in the observed electric angle. This error may be compensated for by means of the part of the method which involves the injection of a first voltage waveform.

A second voltage waveform block 13 is configured to inject a second voltage waveform $u^{h_y}$ into the electrical machine 9 in a first axis of a rotor reference frame, where according to one example $$u^{h_y} = \begin{bmatrix} u_d^{h_y} \cos(\omega_{h_y} \cdot t) \\ 0 \end{bmatrix} \quad (1)$$

where $\omega_{h_y}$ is an angular frequency with a second fundamental frequency. In the present example, the second voltage waveform is a cosine waveform, and thus the second voltage waveform only comprises the second fundamental frequency, but the second voltage waveform could alternatively be another waveform such as a square wave or a pulsating signal. According to this example, the first axis is the d-axis of the rotor reference frame, but could alternatively be the q-axis. According to the example, there is no voltage waveform injected into the second axis, i.e. the q-axis in this example.

The second voltage waveform $u^{h_y}$ is transformed to e.g. a stationary $\alpha\beta$ frame in a vector rotator block 15 and combined with a combined voltage signal $u_{\alpha\beta}$ in the $\alpha\beta$ frame which is based on the output from a main current controlling block 10 transformed to the $\alpha\beta$ frame by means of a vector rotator block 27, for controlling the power converter 7 and thus the electrical machine 9.

An unfiltered second axis current component $i_q$ of a second axis of the rotor reference frame is determined, preferably by measurement. The second axis is in this case the q-axis. The unfiltered second axis current component $i_q$ is filtered in an observer filter module 17 to obtain a second axis current component $i_q^{h_y}$ with the second fundamental frequency. The observer filter module 17 is in this example a band stop filter with the center frequency at the second fundamental frequency. The unfiltered second axis current component $i_q$ is combined with the band stop filtered signal to obtain the second axis current component $i_q^{h_y}$ with the frequency of the second fundamental frequency. Alternatively, the observer filter module 17 may be a bandpass filter with the center frequency at the second fundamental frequency, and thus the second axis current component $i_q^{h_y}$ may be obtained directly at the output of the observer filter module 17. The second axis current component $i_q^{h_y}$ may be expressed as $$i_q^{h_y} = \frac{u_d^{h_y} \cdot \sin(\omega_{h_y} \cdot t)}{2 \cdot \omega_{h_y}(L_d \cdot L_q - L_{dq}^2)}(-2 \cdot L_{dq} \cdot \cos 2\tilde{\theta} - (L_d - L_q) \cdot \sin 2\tilde{\theta}) \quad (2)$$

where $$\tilde{\theta} = \theta_{observer} - \theta_{me} \quad (3)$$

and $\theta_{observer}$ is an observer electric angle, $\theta_{me}$ is the actual electric angle, and $\tilde{\theta}$ is an electric angle error. $L_d$ and $L_q$ are the differential inductances of the d-axis and the q-axis, respectively, and hence $$L_d = \frac{\Delta \psi_d}{\Delta i_d} \text{ and } L_q = \frac{\Delta \psi_q}{\Delta i_q} \cdot u_d^{h_y}$$

is a first axis voltage component at the second fundamental frequency i.e. in this case the d-axis voltage component at the second fundamental frequency, which may be obtained by filtering as explained above.

The second axis current component $i_q^{h_y}$ is demodulated by means of multiplication with a demodulation signal $\sin(\omega_{h_y} \cdot t)$ in a demodulation block 19. This results in $1-\cos^2(2\omega_{h_y} \cdot t)$ from $\sin^2(\omega_{h_y} \cdot t)$ Obtained from the multiplication with $\sin(\omega_{h_y} \cdot t)$. The demodulated second axis current component is low-pass filtered in a low-pass filter block 20 whereby the $\cos^2(2\omega_{h_y} \cdot t)$ term is removed to obtain a low-pass filtered second axis current component $i_q^{h_yLP}$ which can be expressed as $$i_q^{h_yLP} = \frac{u_d^{h_y}}{2 \cdot \omega_{h_y}(L_d \cdot L_q - L_{dq}^2)}(-2 \cdot L_{dq} \cdot \cos 2\tilde{\theta} - (L_d - L_q) \cdot \sin 2\tilde{\theta}) \quad (4)$$

The low-pass filtering may be efficiently performed because the second fundamental frequency $\omega_{h_y}$ is typically several orders higher compared to e.g. the speed dynamics of the electrical machine. The low-pass filtered second axis current component $i_q^{h_yLP}$ is then controlled to zero in a control block 21. Since $L_{dq}$ is close to zero, it is here neglected and set to zero in equation (4). Additionally, all of the terms before the term $\sin 2\tilde{\theta}$ in equation (4) are constants at a specific operating point of the electrical machine 9, and $\sin 2\tilde{\theta} \approx 2\tilde{\theta}$ for small $\tilde{\theta}$. Thus, the electric angle error $\tilde{\theta}$ and the low-pass filtered second axis current component $i_q^{h_yLP}$ are proportional.

The electric angle is in general the integral of the mechanical speed of the electrical machine times the number of pole pairs, which leads to the expression $$i_q^{h_yLP} \propto \int(\omega_{observer} - \omega_{me})dt \quad (5)$$

To keep the low-pass filtered second axis current component $i_q^{h_yLP}$ zero the integral in equation (5) has to be kept zero, and thus the control block 21 has to keep $\omega_{observer} = \omega_{me}$. The observer electric angle $\theta_{observer}$ is determined in a first integrating block 23 by integrating the actual mechanical frequency of the electrical machine times the number of pole pairs, denoted by $\omega_{me}$. $\omega_{me}$ is hence the electrical frequency of the electrical machine 9.

Since $L_{dq}$ in reality is non-zero, the electric angle error $\tilde{\theta}$ is in reality $$\tilde{\theta} = \frac{1}{2} \arctan\left(\frac{2L_{dq}}{L_q - L_d}\right) \quad (6)$$

as derived from equation (4). The injection method described below provides compensation for this error as will be explained in the following, to obtain more precise control.

The second voltage waveform is preferably only injected when the electrical machine 9 is operated at a speed which is lower than 10% of a nominal speed of the electrical machine 9. At higher speeds, other methods may preferably be employed to determine the electric angle, such as the voltage model method or the model adaptive reference observer method.

A first voltage waveform block 25 is configured to inject a first voltage waveform $u^{h_x}$ into the electrical machine 9 in the first axis of the rotor reference frame, where according to one example $$u^{h_x} = \begin{bmatrix} u_d^{h_x} \cos(\omega_{h_x} \cdot t) \\ 0 \end{bmatrix} \quad (7)$$

where $\omega_{h_x}$ is an angular frequency with a first fundamental frequency. In the present example, the first voltage waveform is a cosine waveform, and thus the first voltage waveform only comprises the second fundamental frequency, but the first voltage waveform could alternatively be another waveform such as a square wave or a pulsating signal. No voltage waveform is injected into the second axis, i.e. the q-axis in this example.

The first voltage waveform $u^{h_x}$ is combined with a voltage signal $u_{dq0}$ from the main current controlling block 10 to obtain a combined voltage signal $u_{dq}$ which is transformed to e.g. the $\alpha\beta$ frame in the vector rotator block 27 for controlling the power converter 7 and thus the electrical machine 9.

An unfiltered second axis current component $i_q$ is determined preferably by measurement. This current is first measured in the a,b,c-frame or the $\alpha\beta$ frame before being transformed to the rotor reference frame by means of a vector rotator 24 to obtain the unfiltered second axis current component $i_q$. The second axis is in this case the q-axis. The unfiltered second axis current component $i_q$ is filtered in a filter module 29 to obtain a second axis current component $i_q^{h_x}$ with the second fundamental frequency. The filter module 29 is in this example a band stop filter with the center frequency at the first fundamental frequency. The unfiltered second axis current component $i_q$ is combined with the band stop filtered signal to obtain the second axis current component $i_q^{h_x}$ with the frequency of the first fundamental frequency.

Alternatively, the filter module 29 may be a bandpass filter with the center frequency at the first fundamental frequency, and thus the second axis current component $i^{h_x}$ may be obtained directly at the output of the filter module 29.

A second axis voltage component $u_q^{h_x}$ of the second axis, i.e. the q-axis, having the first fundamental frequency is controlled based on the second axis current component $i_q^{h_x}$ with the frequency of the first fundamental frequency by means of a current controlling block 31 to obtain an adjusted second axis voltage component $u_q^{h_x}$. The adjusted second axis voltage component $u_q^{h_x}$ is fed back and combined with the voltage signal $u_{dq0}$ output by the current controlling block 10 and the injected first voltage waveform $u^{h_x}$ to obtain the combined voltage signal $u_{dq}$ for controlling the electrical machine 9. The current controlling block 31 may for example comprise a resonant controller configured to control the d-axis current component at the first fundamental frequency, i.e. the second axis current component $i_q^{h_x}$. This control and feedback is performed until the second axis current component $i_q^{h_x}$ has a magnitude smaller than a threshold value. Preferably, the second axis current component $i_q^{h_x}$ is controlled to become zero.

The second axis current component $i_q^{h_x}$ may according to one example in which the first voltage waveform $u^{h_x}$ is injected when the electrical machine is operated at a speed which is at most 10% of the nominal speed of the electrical machine be expressed as $$i_q^{h_x} = \frac{1}{L_q}\left(\int u_q^{h_x} dt - L_{dq} \cdot i_d^{h_x}\right) \quad (8)$$

where $i_d^{h_x}$ is a first axis current component with the first fundamental frequency. The first axis current component $i_d^{h_x}$ may be determined in a similar manner as the second axis current component $i_q^{h_x}$, i.e. by measurement and filtering.

The second voltage waveform $u^{h_y}$ may be injected simultaneously with the first voltage waveform $u^{h_x}$ when the electrical machine is operated at a speed which is at most 10% of the nominal speed of the electrical machine. In order to be able to distinguish between the two injections properly in processing, the first fundamental frequency and the second fundamental frequency are preferably non-integer multiples of each other. The first fundamental frequency and the second fundamental frequency are hence preferably not divisible. The first fundamental frequency may for example be a first prime number and the second fundamental frequency may be a second prime number.

By controlling the second axis current component $i_q^{h_x}$ to zero, it follows from equation (8) that the differential cross-coupling parameter in the form of a differential cross-coupling inductance $L_{dq}$ may be determined by $$L_{dq} = \frac{1}{i_d^{h_x}} \int u_q^{h_x} dt \quad (9)$$

i.e. by integrating the second axis voltage component $u_q^{h_x}$ in a second integrating block 33 and multiplying the integrated second voltage component $u_q^{h_x}$ with the inverse of the first axis current component $i_d^{h_x}$ in a multiplication block 35.

In an example in which the first voltage waveform $u^{h_x}$ is injected when the electrical machine is operated at a speed which is at least 10% of the nominal speed of the electrical machine 9 and not higher than the nominal speed of the electrical machine 9, the differential cross-coupling inductance $L_{dq}$ may, when the second axis current component $i_q^{h_x}$ has been controlled to zero, be expressed as $$L_{dq} = \frac{1}{i_d^{h_x}} \int \left(u_q^{h_x} - \omega_{me} L_d i_d^{h_x}\right) dt \quad (10)$$

The electric angle error $\tilde{\theta}$ may in both cases shown in equations (8) and (10) be determined based on the differential cross-coupling inductance $L_{dq}$ in an electric angle error estimating block 39 using equation (6).

The differential inductances $L_d$ and $L_q$ used equation (6) may be obtained by the electrical angle error estimating block 39 using a current reference $i_{dqref}$ and a look-up table 38 containing the differential inductances $L_d$ and $L_q$ for the specific operating point of the electrical machine 9 and thus the current reference $i_{dqref}$.

When the electric angle error $\tilde{\theta}$ has been determined, it may be stored in the storage medium 3, to be used for example once the injection of the second voltage waveform $u^{h_y}$ has ended and the observer electric angle $\theta_{observer}$ has been determined in case the electrical machine 9 is operated at a speed which is lower than 10% of the nominal speed of the electrical machine 9. In case the first voltage waveform $u^{h_x}$ is injected when the electrical machine is operated at a speed which is at least 10% of the nominal speed of the electrical machine and not higher than the nominal speed, the electric angle error $\tilde{\theta}$ or the corresponding differential cross-coupling inductance $L_{qd}$ may be interpolated for the particular torque at which it was calculated to the same torque for a speed which is lower than 10% of the nominal speed of the electrical machine and stored in the storage medium 3, for example in a look-up table.

The electric angle error $\tilde{\theta}$ may be combined with the observer electric angle $\theta_{observer}$ to obtain the actual electric angle $\theta_{me}$. The electric angle error d is preferably depending on machine type added to or subtracted from the observer electric angle $\theta_{observer}$ to obtain the actual electric angle $\theta_{me}$. The actual electric angle $\theta_{me}$ may then be used for controlling the power converter 7 and the electrical machine 9. The actual electric angle $\theta_{me}$ may be used in the vector rotator blocks 15, 26 and 27, for example, to obtain a correct transformation between the $\alpha\beta$-frame and the d-q frame.

The first voltage waveform could instead of being injected in the first axis be injected in the second axis, i.e. the q-axis. In this case, the processing of the electrical parameters would be performed on the other axis compared to the example above, e.g. equation (8) would instead be for the d-axis current.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of controlling an electrical machine, wherein the method comprises:
  a) injecting a first voltage waveform ($u^{h_x}$) with a first fundamental frequency into the electrical machine in a first axis of a rotor reference frame, combined with a voltage signal for controlling the electrical machine,
  b) determining a second axis current component ($i_q^{h_x}$) of a second axis of the rotor reference frame, having the first fundamental frequency, generated in response to the injection of the first voltage waveform ($u^{h_x}$),
  c) controlling, based on the second axis current component ($i_q^{h_x}$), a second axis voltage component ($u_q^{h_x}$) of the second axis, having the first fundamental frequency, to obtain an adjusted second axis voltage component ($u_q^{h_x}$) for controlling the second axis current component ($i_q^{h_x}$) towards zero,
  d) feeding back the adjusted second axis voltage component to combine the adjusted second axis voltage component with the voltage signal and the injected first voltage waveform ($u^{h_x}$), and repeating steps b)-d) until the second axis current component ($i_q^{h_x}$) is smaller than a threshold value,
  e) determining a differential cross-coupling parameter of the electrical machine based on the second axis voltage component ($u_q^{h_x}$) and a first axis current component ($i_d^{h_x}$) having the first fundamental frequency, when the second axis current component ($i_q^{h_x}$) is smaller than the threshold value, and
  g) controlling the electrical machine based on the differential cross-coupling parameter.

2. The method as claimed in claim 1, comprising f) determining an electric angle error ($\tilde{\theta}$) based on the differential cross-coupling parameter, wherein the electric angle error ($\tilde{\theta}$) is used for error compensation in step g) of controlling.

3. The method as claimed in claim 2, comprising h) injecting a second voltage waveform ($u^{h_y}$) with a second fundamental frequency into the electrical machine in the first axis of the rotor reference frame, combined with the voltage signal for controlling the electrical machine, and i) determining an observed electric angle ($\theta_{observer}$) based on the second voltage waveform ($u^{h_y}$), wherein the method includes j) determining an actual electric angle ($\theta_{me}$) based on the observed electric angle ($\theta_{observer}$) and the electric angle error ($\tilde{\theta}$), and wherein the controlling in step g) is based on the actual electric angle ($\theta_{me}$).

4. The method as claimed in claim 3, wherein step i) includes i1) determining a second axis current component ($i_q^{h_y}$) of the second axis of the rotor reference frame, having the second fundamental frequency, generated in response to the injection of the second voltage waveform ($u^{h_y}$), i2) demodulating the second axis current component ($i_q^{h_y}$) i3) low-pass filtering the demodulated second axis current component, and i4) controlling the low-pass filtered second axis current component to zero, to thereby obtain an actual mechanical speed times the number of pole pairs ($\omega_{me}$), and i5) determining the observed electric angle ($\theta_{observer}$) by integration of the actual mechanical speed times the number of pole pairs ($\omega_{me}$).

5. The method as claimed in 3, comprising performing steps a)-e) only when the electrical machine is operated at a speed which is at least 10% of a nominal speed of the electrical machine and not higher than the nominal speed.

6. The method as claimed in claim 5, comprising interpolating the differential cross-coupling parameter or the electric angle error ($\tilde{\theta}$) determined based on the differential cross-coupling parameter for a specific torque at a speed which is at least 10% of the nominal speed of the electrical machine and not higher than the nominal speed to the same torque for a speed which is lower than 10% of the nominal speed of the electrical machine, and storing the interpolated differential cross-coupling parameter or electric angle error ($\tilde{\theta}$) in a look-up table.

7. The method as claimed in claim 3, comprising performing steps h)-j) and g) only when the electrical machine is operated at a speed which is lower than 10% of a nominal speed of the electrical machine (9).

8. The method as claimed in claim 3, wherein steps a) and h) are performed simultaneously, wherein the first fundamental frequency is a non-integer multiple of the second fundamental frequency.

9. The method as claimed in claim 8, wherein the first fundamental frequency is a first prime number and the second fundamental frequency is a second prime number.

10. The method as claimed in claim 1, wherein the differential cross-coupling parameter is a differential cross-coupling inductance or a differential cross-coupling flux.

11. The method as claimed in claim 1, wherein the differential cross-coupling parameter is a differential cross-coupling inductance, and wherein step e) involves integrating the second axis voltage component ($u_q^{h_x}$) and multiplying the integrated second axis voltage component ($u_q^{h_x}$) with the inverse of the first axis current component ($i_d^{h_x}$) having the first fundamental frequency to obtain the differential cross-coupling parameter.

12. The method as claimed in claim 1, wherein step a) of determining the second axis current component ($i_q^{h_x}$) involves filtering a non-filtered second axis current component ($i_q$) with a filter that has a center frequency at the first fundamental frequency, to obtain the second axis current component ($i_q^{h_x}$).

13. A computer program comprising computer executable components which when executed by processing circuitry of a control system causes the control system to perform the steps of the method as claimed in claim 1.

14. A control system for controlling an electrical machine, wherein the control system comprises:
processing circuitry, and
a storage medium having a computer program which when executed by the processing circuitry causes the control system to perform the steps of a method including:
a) injecting a first voltage waveform ($u^{h_x}$) with a first fundamental frequency into the electrical machine in a first axis of a rotor reference frame, combined with a voltage signal for controlling the electrical machine,
b) determining a second axis current component ($i_q^{h_x}$) of a second axis of the rotor reference frame, having the first fundamental frequency, generated in response to the injection of the first voltage waveform ($u^{h_x}$),
c) controlling, based on the second axis current component ($i_q^{h_x}$), a second axis voltage component ($u_q^{h_x}$) of the second axis, having the first fundamental frequency, to obtain an adjusted second axis voltage component ($u_q^{h_x}$) for controlling the second axis current component ($i_q^{h_x}$) towards zero,
d) feeding back the adjusted second axis voltage component to combine the adjusted second axis voltage component with the voltage signal and the injected first voltage waveform ($u^{h_x}$), and repeating steps b)-d) until the second axis current component ($i_q^{h_x}$) is smaller than a threshold value,
e) determining a differential cross-coupling parameter of the electrical machine based on the second axis voltage component ($u_q^{h_x}$) and a first axis current component ($i_d^{h_x}$) having the first fundamental frequency, when the second axis current component ($i_q^{h_x}$) is smaller than the threshold value, and
g) controlling the electrical machine based on the differential cross-coupling parameter.

15. An electrical power system comprising:
an electrical machine,
a power converter configured to control the electrical machine, and
a control system configured to control the power converter, wherein the control system includes:
processing circuitry, and
a storage medium having a computer program which when executed by the processing circuitry causes the control system to perform the steps of a method including:
a) injecting a first voltage waveform ($u^{h_x}$) with a first fundamental frequency into the electrical machine in a first axis of a rotor reference frame, combined with a voltage signal for controlling the electrical machine,
b) determining a second axis current component ($i_q^{h_x}$) of a second axis of the rotor reference frame, having the first fundamental frequency, generated in response to the injection of the first voltage waveform ($u^{h_x}$),
c) controlling, based on the second axis current component ($i_q^{h_x}$), a second axis voltage component ($u_q^{h_x}$) of the second axis, having the first fundamental frequency, to obtain an adjusted second axis voltage component ($u_q^{h_x}$) for controlling the second axis current component ($i_q^{h_x}$) towards zero,
d) feeding back the adjusted second axis voltage component to combine the adjusted second axis voltage component with the voltage signal and the injected first voltage waveform ($u^{h_x}$), and repeating steps b)-d) until the second axis current component ($i_q^{h_x}$) is smaller than a threshold value,
e) determining a differential cross-coupling parameter of the electrical machine based on the second axis voltage component ($u_q^{h_x}$) and a first axis current component ($i_d^{h_x}$) having the first fundamental frequency, when the second axis current component ($i_q^{h_x}$) is smaller than the threshold value, and
g) controlling the electrical machine based on the differential cross-coupling parameter.

16. The method as claimed in 4, comprising performing steps a)-e) only when the electrical machine is operated at a speed which is at least 10% of a nominal speed of the electrical machine and not higher than the nominal speed.

17. The method as claimed in claim 4, wherein steps a) and h) are performed simultaneously, wherein the first fundamental frequency is a non-integer multiple of the second fundamental frequency.

* * * * *